UNITED STATES PATENT OFFICE.

GEORGE A. STARKWEATHER, OF WAYMART, PENNSYLVANIA.

IMPROVED PROCESS OF TANNING HIDES.

Specification forming part of Letters Patent No. 82,763, dated October 6, 1868,

*To all whom it may concern:*

Be it known that I, GEORGE A. STARKWEATHER, of Waymart, Wayne county, and State of Pennsylvania, have invented an Improvement in the Art of Tanning Hides and Skins into Leather; and I do hereby declare that the following is a full and exact description thereof.

I soak the hides and remove the blood and dirt. Then I soak the hides in urine and add potash or any kind of alkali, which will in a short time loosen the hair and kill the grease. Then remove the hair. (Hides intended for upper, stone on the flesh, then on the grain, and soften them to your liking, at any time during the process of tanning, by putting them into a milk-warm solution, made from perennial plants and fermented wheat-bran and potash, or, in place of plants, sumac, for the space of from six to forty-eight hours, according to the hides and suppleness of leather desired.) Then, for one hundred sides, give them a liquor made from oak-bark, or any other tanning material, enough to well cover the sides. Put in the liquor one-half bushel salt, one quart oil of vitriol, one bushel wheat-bran. Handle well for five hours, draw the sides, strengthen the liquor by increasing it; add two quarts oil of vitriol, one-half bushel of salt, and one bushel wheat-bran. Handle the sides four or five times a day for two days; then draw the sides; give them a new liquor; add one-fourth bushel of salt, one bushel wheat-bran. Handle the sides three times a day for three days, then draw the sides, and give them a lay-away liquor; lay between the sides the old bran and plants and one bushel new bran, and in five days draw and lay away in new liquor, as before, and every seven days thereafter give them a new lay-away till tanned. For one hundred calf-skins use one-fifth of the same.

I claim—

1. The process of tanning hides or skins into leather by the use of urine, alkali, fermented wheat-bran, and decoction made from plants, salt, oil of vitriol, and tan-liquor, as set forth.

2. The use of plants in laying away hides or leather.

GEO. A. STARKWEATHER.

Witnesses:
    E. T. STARKWEATHER,
    I. A. STARKWEATHER.